United States Patent
Schleith et al.

(10) Patent No.: US 6,790,385 B2
(45) Date of Patent: Sep. 14, 2004

(54) SLIP-MODIFIED, ELECTRICALLY CONDUCTIVE POLYOXYMETHYLENE

(75) Inventors: Oskar Schleith, Hofheim (DE); Klaus Kurz, Kelsterbach (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 10/204,912

(22) PCT Filed: Feb. 22, 2001

(86) PCT No.: PCT/EP01/02013

§ 371 (c)(1),
(2), (4) Date: Oct. 31, 2002

(87) PCT Pub. No.: WO01/64788

PCT Pub. Date: Sep. 7, 2001

(65) Prior Publication Data

US 2003/0102464 A1 Jun. 5, 2003

(30) Foreign Application Priority Data

Feb. 28, 2000 (DE) .......................... 100 09 282

(51) Int. Cl.$^7$ ................................. H01B 1/24
(52) U.S. Cl. ...................... 252/511; 106/231; 524/496
(58) Field of Search .................. 252/511; 106/230, 106/231, 822; 524/496

(56) References Cited

U.S. PATENT DOCUMENTS

| | | | | |
|---|---|---|---|---|
| 4,391,741 A | * | 7/1983 | Masamoto et al. | 252/511 |
| 4,555,357 A | * | 11/1985 | Kausga et al. | 252/511 |
| 4,596,847 A | * | 6/1986 | Kasuga et al. | 524/220 |
| 4,828,755 A | | 5/1989 | Kusumgar et al. | 252/511 |
| 5,902,517 A | * | 5/1999 | Thielen | 252/511 |
| 6,046,141 A | | 4/2000 | Kurz et al. | 508/100 |

FOREIGN PATENT DOCUMENTS

EP          0905190          3/1999

OTHER PUBLICATIONS

CARBOWAX 3350 Lubricants Info Sheet (Dow.com) No Pub date.*

\* cited by examiner

*Primary Examiner*—Mark Kopec
(74) *Attorney, Agent, or Firm*—Connolly Bove Lodge & Hutz, LLP

(57) ABSTRACT

Polyoxymethylene with addition of conductivity black and of a lubricant mixture composed of a lubricant with predominantly external lubricant action and of a lubricant with predominantly internal action, and also with addition of an impact-modifier component provides a high level of electrical conductivity with good mechanical and tribological qualities. It is used for functional components with requirements for good electrical conductivity with good wear performance.

12 Claims, No Drawings

SLIP-MODIFIED, ELECTRICALLY CONDUCTIVE POLYOXYMETHYLENE

The invention relates to an electrically conductive polyoxymethylene molding composition whose electrical conductivity is maintained via addition of a lubricant mixture composed of a lubricant with predominantly external lubricant action and of a lubricant with predominantly internal lubricant action in order to improve abrasion performance, and to its use.

Traditional materials, such as metals, are increasingly undergoing successful replacement by plastics. Because the electrical resistances within plastics are usually very high, there is a risk of electrostatic charging, and this can be disruptive in certain application sectors, or can even be dangerous. Attempts are therefore being made to improve the electrical conductivity of plastics. A suitable method of reducing internal electrical resistance is the addition of metal powders and metal fibers, carbon fibers, graphite, or carbon black. The last-mentioned is in particular capable of universal use and processing to provide polymers with conductivity. The use of highly structured carbon blacks means that the amounts required are markedly lower than for graphite. A disadvantage with the use of highly structured carbon blacks is their sensitivity to processing effects. On the one hand, the dispersion of the carbon black has to be sufficiently good, and on the other hand excessive shear must not be allowed to break down the carbon black agglomerates. For this reason, use is often made of lubricant additives intended to contribute to low shear within the melt.

Many of the moldings produced from electrically conductive polyoxymethylene are also subject to tribological stresses. It is well known that additions of lubricants can improve the tribological, i.e. sliding and friction, properties of thermoplastics. However, the problem is to find the correct selection and combination of lubricants for the particular plastic. The processing aids used in POM are not suitable for reducing abrasion on moldings subject to wear. Only a few lubricants are capable of reducing abrasion when used with conductivity black incorporated into POM. It is likely that they disrupt the bonding between matrix and carbon black. This may well also be the reason for the reduction in mechanical properties. Careful use of the lubricants and optimized selection of the same are therefore required.

Another problem with the conductivity blacks is the fall-off in toughness. This can be compensated by addition of elastomers.

U.S. Pat. No. 4,828,755 describes a mixture where polyethylene glycol and non-polar polyethylene wax are proposed for incorporation of conductivity black into polyoxymethylene. As is shown by the low electrical resistance values, the lubricants achieve incorporation of the carbon black into the matrix under gentle conditions, but abrasion from the resultant moldings is high, and mechanical properties, and also heat resistance, are severely reduced over the base material.

The object of the present invention was to improve abrasion performance and reduce the fall-off in mechanical properties while retaining the good electrical conductivity of a polyoxymethylene modified with conductivity black.

The object of the invention was achieved by using a lubricant mixture composed of a lubricant with predominantly external lubricant action, i.e. surface-active lubricants, and a lubricant with predominantly internal lubricant action, i.e. viscosity-reducing lubricants, that is to say lubricants whose lubricant effect acts predominantly within the melt.

The invention provides a molding composition composed of 30 to 89 parts by weight of a polyoxymethylene (A) and from 2 to 10 parts by weight, preferably from 3 to 5 parts by weight, of a conductivity black (B), and also from 0.5 to 6 parts by weight, preferably from 3 to 5 parts by weight, of a lubricant mixture (C) composed of a lubricant with predominantly internal lubricant action and of a lubricant with predominantly external lubricant action, and from 1 to 12 parts by weight, preferably from 5 to 10 parts by weight, of an impact-modifier component (D). The mixing ratio of lubricant with predominantly internal lubricant action to lubricant with predominantly external lubricant action may be from 0:100 to 100:0 parts by weight. The molding composition may comprise additives and processing aids (E) in amounts of from 0.005 to 50 parts by weight. Components (A) to (E) here always give a total of 100 parts by weight.

As stated at the outset, polyoxymethylene is a suitable component (A).

The polyoxymethylenes (POMs), for example as described in DE-A 29 47 490, are generally unbranched linear polymers, generally containing at least 80%, preferably at least 90%, of oxymethylene units (—CH$_2$O—). The term polyoxymethylenes here encompasses homopolymers of formaldehyde or of its cyclic oligomers, such as trioxane or tetroxane, and also corresponding copolymers.

Homopolymers of formaldehyde or of trioxane are polymers whose hydroxy end groups have been stabilized chemically in a known manner to prevent degradation, e.g. by esterification or etherification. Copolymers are polymers of formaldehyde or of its cyclic oligomers, in particular trioxane, with cyclic ethers, with cyclic acetals, and/or with linear polyacetals.

These POM homo- or copolymers are known per se to the skilled worker and are described in the literature. Very generally, these polymers have at least 50 mol % of —CH$_2$O— repeat units in the main polymer chain. The homopolymers are generally prepared by polymerization of formaldehyde or trioxane, preferably in the presence of suitable catalysts.

For the purposes of the invention, POM copolymers are preferred as component (A), in particular those which, besides the —CH$_2$O— repeat units, also contain up to 50 mol %, preferably from 0.1 to 20 mol %, and in particular from 0.5 to 10 mol %, of

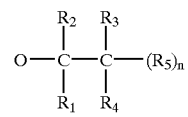

repeat units, where $R^1$ to $R^4$, independently of one another, are a hydrogen atom, a $C_1$–$C_4$-alkyl group, or a halo-substituted alkyl group having from 1 to 4 carbon atoms, and $R^5$ is —CH$_2$—, —CH$_2$O—, a $C_1$–$C_4$-alkyl-substituted or $C_1$–$C_4$-haloalkyl-substituted methylene group, or a corresponding oxymethylene group, and n has a value in the range from 0 to 3. These groups may advantageously be introduced into the copolymers via ring-opening of cyclic ethers. Preferred cyclic ethers are those of the formula

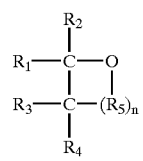

where $R^1$ to $R^5$ and n are as defined above. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also linear oligo- or polyformals, such as polydioxolane or polydioxepan as comonomers.

Particularly advantageous copolymers are those of from 99.5 to 95 mol % of trioxane and from 0.5 to 5 mol % of one of the above-mentioned comonomers.

Other suitable components (A) are oxymethyleneterpolymers, prepared, for example, by reacting trioxane, one of the cyclic ethers described above, and a third monomer, preferably a bifunctional compound of the formula

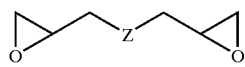

where Z is a chemical bond, —O—, or —ORO— (R=$C_1$–$C_8$-alkylene or $C_2$–$C_8$-cycloalkylene).

Preferred monomers of this type are ethylene diglycide, diglycidyl ether, and diethers made from glycidyl compounds and formaldehyde, dioxane, or trioxane in a molar ratio of 2:1, and also diethers made from 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol, or 1,4-cyclohexanediol, to mention merely a few examples.

Processes for preparing the POM homo- and copolymers described above are known to the skilled worker and are described in the literature.

The preferred POM copolymers have melting points of at least 150° C. and molecular weights (weight-average) $M_w$ in the range from 5000 to 200,000, preferably from 7000 to 150,000. Particular preference is given to end-group-stabilized POM polymers which have carbon-carbon bonds at the ends of the chains.

The melt index (MVR 190/2.16) of the POM polymers used is generally from 2 to 50 $cm^3$/10 min (ISO 1133).

Conductivity blacks (B) are carbon blacks with a very high degree of structure. In these carbon blacks, there is a relationship between structure, surface and particle size. Surface and structure increase as particle size reduces. A high degree of structure permits achievement of better electrical conductivity. Dibutyl phthalate absorption serves as a measure of structure. Conductivity blacks which have high activity have dibutyl phthalate absorption above 450 $cm^3$/100 g.

The lubricant mixture (C) is composed of a lubricant with predominantly external lubricant action and of a lubricant with predominantly internal lubricant action. The mixing ratio between lubricant with predominantly internal lubricant action and lubricant with predominantly external lubricant action may be from 0:100 to 100:0 parts by weight. Lubricants which may be used and have predominantly external lubricant action are solid and/or liquid paraffins, montanic esters, partially saponified montanic esters, stearic acids, polar polyethylene waxes, non-polar polyethylene waxes, poly-α-olefin oligomers, silicone oils, polyalkylene glycols, and perfluoroalkyl ethers. Soaps and esters, including those which have been partially saponified, are lubricants with external lubricant action and also lubricants with internal lubricant action. Preference is given to the use of a high-molecular-weight, oxidized and therefore polar polyethylene wax. This improves tribological performance and can reduce the severity of fall-off in mechanical properties. Stearyl stearate is preferably used as lubricant with predominantly internal lubricant action, and provides gentle conditions for incorporation of the carbon black.

Using the predominantly surface-active oxidized polyethylene wax on its own in the polyoxymethylene/conductivity black mixture can achieve higher strength, particularly within the weld line, and better wear performance when comparison is made with a lubricant with predominantly internal lubricant action. However, in order to maintain the conductivity of the carbon black the addition of an internal lubricant is necessary.

The particular features of the oxidized polyethylene wax are the functional groups having oxygen bonded at the surface. They are generated in a controlled manner by oxidative post-treatment. The oxidative post-treatment of the polyethylene wax improves affinity to the POM. When comparison is made with other polyethylene waxes, there is a less severe reduction in weld line extensibility, and sliding abrasion is reduced. This is described in patent application EP 0 905 190 A1. Paraffins, solid or liquid, stearic acids, polyethylene waxes, non-polar or polar, poly-α-olefin oligomers, silicone oils, polyalkylene glycols, and perfluoroalkyl ethers are lubricants with predominantly external lubricant action. Soaps and esters, including those which have been partially saponified, are lubricants with both external and internal lubricant action. Montanic esters and partially saponified montanic esters are lubricants with predominantly external lubricant action.

The preferred oxidized polyethylene wax in component (C) is a high-molecular-weight, polar wax, and generally has an acid value of from 12 to 20 mg KOH/g and a viscosity of from 300 to 5000 mPa*s at 140° C.

Mention may be made of the following lubricants with predominantly internal lubricant action within component (C): fatty alcohols, dicarboxylic esters, fatty esters, fatty acids, fatty soaps, fatty amides, wax esters, and stearyl stearates, the last-named being preferred. Lubricants are described in Gächter/Müller, "Taschenbuch der Kunststoff-Additive" [Plastics Additives Handbook], 3rd Edition, Carl Hanser Verlag Munich/Vienna 1994, pp. 478–504, incorporated herein by way of reference.

Preferred impact-modifier components (D) are thermoplastically processable elastomers, preferably TPEU (thermoplastic polyurethane elastomers). These materials are multiblock copolymers composed of stiff urethane segments and of flexible long-chain diol segments.

The stiff urethane segments here are obtained from a reaction between diisocyanates and what are known as chain extenders. Aromatic, alicyclic, or aliphatic diisocyanates may be used as diisocyanate. Preference is given here to diphenylmethane 4,4'-diisocyanate (MDI), tolylene diisocyanate (TDI), m-xylylene diisocyanate, p-xylylene diisocyanate, naphthylene diisocyanate, methylenebis (cyclohexyl 4-isocyanate), isophorone diisocyanate, and hexamethylene 1,6-diisocyanate. The chain extenders used comprise short-chain aliphatic, alicyclic, or aromatic diols or diamines with molar mass below 500 g/mol, preferably below 300 g/mol. Examples of chain extenders whose use is preferred are ethylene glycol, propylene 1,3-glycol, propylene 1,2-glycol, 1,4-butanediol, 1,5-pentanediol, 1,6-hexanediol, 1,4-cyclohexanediol, ethylenediamine, hexamethylenediamine, xylylenediamine, and 4,4'-diaminodiphenylmethane.

The flexible long-chain diol segments may be selected from polyetherdiols, polyesterdiols, polyetheresterdiols, and polycarbonatediols with number-average molar mass of from 500 to 5000 g/mol, preferably from 1000 to 3000 g/mol. The polyetherdiols may be obtained by ring-opening polymerization of cyclic C2–C12 ethers, e.g. ethylene oxide, propylene oxide, or tetrahydrofuran. The polyesterdiols may be obtained by esterification reactions of dialcohols (examples of those preferred here being ethylene glycol, propylene 1,3-glycol, propylene 1,2-glycol, 1,4-butanediol, 1,3-butanediol, 2-methylpropanediol, 1,5-pentanediol, 3-methyl-1,5-pentanediol, 1,6-hexanediol, neopentyl glycol, nonanediol, 1,10-decanediol) and dicarboxylic acids (examples of those preferred here being glutaric acid, adipic acid, pimelic acid, subaric acid, sebacic acid, terephthalic acid, and isophthalic acid), or by corresponding transesterification reactions. It is also possible to obtain polyesterdiols of this type by ring-opening polymerization of lactones (examples of those preferred here being caprolactone, propiolactone, and valerolactone). The polycarbonates may be obtained by the reaction of dialcohols (examples of those preferred here being ethylene glycol, propylene 1,3-glycol, propylene 1,2-glycol, 1,4-butanediol, 1,3-butanediol, 2-methylpropanediol, 1,5-pentanediol, 3-methyl-1,5-pentanediol, 1,6-hexanediol, neopentyl glycol, nonanediol, 1,10-decanediol) with diphenyl carbonate or phosgene.

Polyester urethanes are preferably used for the molding composition described. The products lie within the hardness range of from about Shore A 65 to about Shore D 75. This hardness is also a measure of the proportion of the stiff urethane segments to the flexible long-chain diol segments. The melt index of the products is measured at various temperatures, depending on the melting behavior of the stiff urethane segments. It is also a measure of the degree of addition (molar mass of the entire chains).

The additives and processing aids (E) used may be additives such as formaldehyde scavengers, acid scavengers, antioxidants, UV stabilizers, coupling agents, nucleating agents, and mold-release agents, the proportion of which in component (E) is from 0.005 to 5 parts by weight. Additional substances used for improving electrical conductivity are those such as antistats, graphite, carbon fibers, and also mixtures of these. The proportions by weight of these substances in component (E) are from 0.5 to 20 parts by weight. It is also possible to use additional lubricants, such as ultrahigh-molecular-weight polyethylene (UHMWPE), aramid fiber, chalk, wollastonite, polytetrafluoroethylene (PTFE), or graft copolymer which is a product of a graft reaction of an olefin polymer with an acrylonitrile-styrene copolymer, or a mixture of these, using from 0.5 to 25 parts by weight in component (E).

The molding composition of the invention is suitable for functional components in which static charge is undesirable or dangerous. It is particularly suitable for applications which also demand low friction and low wear. The components produced from the molding composition may be extruded films or sheets, or else injection moldings. Examples which may be mentioned are: functional components, such as level probes for heating-oil tanks, membrane grids in contactless fill-level measurement systems, strippers on paper-transport-process devices, transport rollers for transport systems, and chain links, slide rails, and gearwheels.

EXAMPLES

For inventive example 2 and comparative example 1, use was made of a copolymer of trioxane and dioxolane with melt volume index MVR 190/2.16 of 8 cm$^3$/10 min. The copolymer was treated with the additives listed in Table 1.

TABLE 1

| Example 1 Comparative mixing specification | parts by weight | Example 2 Mixing specification of the invention | Parts by weight |
|---|---|---|---|
| POM copolymer | 81.2 | POM copolymer | 85 |
| Conductivity black | 4 | Conductivity black | 4 |
| Polyester urethane | 10 | Polyesterurethane | 7 |
| Polyethylene glycol | 3 | Stearyl stearate | 2 |
| Non-polar PE wax | 1.8 | Polar PE wax | 2 |

The POM copolymer was mixed with the respective additives in a Diosna V 100 high-speed fluidizing mixer (Dierks u. Söhne, Osnabrück, Germany) and melted in a ZE 25×33 D twin-screw extruder (Berstorff, Hanover, Germany) using a melt temperature of 200° C., and then pelletized.

These pellets were dried for 8 hours at 120° C. and then injection molded to give test specimens for mechanical and tribological testing. The injection molding machine used was model KM 90/210 B (Krauss Maffei, Munich, Germany). The processing conditions were selected in accordance with the recommendations of ISO 9988-2, standard for POM material.

Tests:
Rheological Properties
  MVR 190/2.16 to ISO 1133
Mechanical Properties
  Tensile test to ISO 527 Parts 1 and 2
Thermal Properties
  Heat resistance HDT/A (1.8 N/mm$^2$) to ISO 75 Parts 1 and 2
Electrical Properties
  Volume resistivity to IEC 93
  Surface resistivity to IEC 93
Wear Tests
  Abrasion was measured on a wear shaft—a rotating shaft onto which are pressed cylindrical test specimens of diameter 12 mm made from the material to be tested. The volume of wear is determined as a function of time. The principle of the test corresponds to the "pin on ring" principle to ISO/DIS 7148-2.
Test Conditions:

| | |
|---|---|
| Shaft material | Steel |
| Shaft diameter | 65 mm |
| Roughness depth Rz | about 0.8 µm |
| Load | 3.1 N |
| Sliding velocity | 136 m/min |
| Duration of experiments | 60 h |

Table 2 lists the test results.

TABLE 2

| Results | Example 1 Comparative mixing specification | Example 2 Mixing specification of the invention |
|---|---|---|
| Yield stress | 34 MPa | 50 MPa |
| Heat resistance | 67° C. | 78° C. |

TABLE 2-continued

| Results | Example 1<br>Comparative mixing<br>specification | Example 2<br>Mixing specification of<br>the invention |
| --- | --- | --- |
| Volume resistivity | 1100 ohm cm | 1030 ohm cm |
| Surface resistivity | 500 ohm | 580 ohm |
| Volume of wear | 25 mm$^3$ | 9 mm$^3$ |

The examples show that in example 2, the mixing specification with oxidized polyethylene wax in combination with stearyl stearate, markedly higher yield stress and higher heat resistance are found, while electrical properties remain the same as in example 1. Abrasion in example 2 is likewise markedly lower than in example 1.

The mixing specification of example 2 is a compromise between a lubricant with predominantly external lubricant action and a lubricant with predominantly internal lubricant action.

The action of the individual lubricants alone was investigated in examples 3 and 4 (Table 3). It can be seen from the results in Table 4 that the flowability of the melt has been improved in example 4, providing gentler conditions for incorporation of the conductivity black. As a result, electrical properties are better in example 4 than in example 3. However, example 3 has better weld line strength and lower volume of wear, using a lubricant with predominantly external lubricant action.

TABLE 3

| Example 3 | Parts by weight | Example 4 | Parts by weight |
| --- | --- | --- | --- |
| POM copolymer | 86 | POM copolymer | 86 |
| Conductivity black | 4 | Conductivity black | 4 |
| Polyesterurethane | 7 | Polyesterurethane | 7 |
| Polar PE wax | 3 | Stearyl stearate | 3 |

TABLE 4

| Results | Example 3 | Example 4 |
| --- | --- | --- |
| MVR 190/2.16 | 0.34 cm$^3$/10 min | 1.15 cm$^3$/10 min |
| Yield stress with weld line | 55 MPa | 47 MPa |
| Volume resistivity | 8300 ohm cm | 4200 ohm cm |
| Surface resistivity | 760 ohm | 230 ohm |
| Volume of wear | 10.9 mm$^3$ | 20.6 mm$^3$ |

What is claimed is:

1. A thermoplastic molding composition composed of component (A) from 14 to 97.5 parts by weight of a polyoxymethylenehomo- or copolymer, component (B) from 1 to 10 parts by weight of a conductivity black, component (C) from 0.5 to 6 parts by weight of a lubricant mixture composed of a lubricant with predominantly internal lubricant action and of a lubricant with predominantly external lubricant action, component (D) from 1 to 25 parts by weight of an impact-modifier component, and (E) from 0 to 50 parts by weight of other additives and processing aids, fillers, reinforcing materials, and/or polymeric lubricants, the entirety of components (A), (B), and (C) always being 100 parts by weight component and wherein the lubricant with predominantly internal lubricant action is a stearyl stearate.

2. The molding composition as claimed in claim 1, which is composed of (A) from 60 to 89 parts by weight of component (A), (B) from 3 to 5 parts by weight of component (B), (C) from 3 to 5 parts by weight of component (C), (D) from 5 to 10 parts by weight of an impact-modifier component (D).

3. The molding composition as claimed in claim 2, wherein said component (D) is a polyesterurethane.

4. The molding composition as claimed in claim 3, wherein said component (E) is one or more materials selected from the group consisting of chalk, talc, wollastonite, mica, zinc oxide, silicon dioxide, the reinforcing materials glass fibers, carbon fibers, organic high-modulus fibers, polymeric lubricants polytetrafluoroethylene in pulverulent form, ethylene in fiber form, UHMW polyethylene and graft polymers obtained from a graft reaction of polyethylene with acrylonitrile-styrene copolymer (SAN).

5. The molding composition as claimed in claim 1, wherein said lubricant with predominantly external lubricant action is selected from the group consisting of solid paraffin, liquid paraffin, montanic esters, partially saponified montanic esters, stearic acids, polar polyethylene waxes, non-polar polyethylene waxes, poly-α-olefin oligomers, silicone oils, polyalkylene glycols and perfluoroalkyl ethers.

6. The molding composition as claimed in claim 1, wherein said lubricant with predominantly external lubricant action is a high-molecular-weight, polar polyethylene wax and has an acid value of from 12 to 20 mg KOH/g and a viscosity of from 3000 to 5000 mPa*s at a temperature of 140° C.

7. The molding composition as claimed in claim 1, wherein said component (D) is a thermoplastic polyurethane elastomer.

8. The molding composition as claimed in claim 1, wherein said component (D) is a polyesterurethane.

9. The molding composition as claimed in claim 1, wherein said component (E) is one or more materials selected from the group consisting of chalk, talc, wollastonite, mica, zinc oxide, silicon dioxide, the reinforcing materials glass fibers, carbon fibers, organic high-modulus fibers, polymeric lubricants polytetrafluoroethylene in pulverulent form, ethylene in fiber form, UHMW polyethylene and graft polymers obtained from a graft reaction of polyethylene with acrylonitrile-styrene copolymer (SAN).

10. A film comprising the molding composition as claimed in claim 1.

11. A function component with requirements for good electrical conductivity and good wear performance which comprise the molding composition as claimed in claim 1 and wherein the function component is selected from the group consisting of level probes for heating oil tanks, membrane grids in contactless fill-level measurement systems, chain links, slide rails and gearwheels.

12. A molding produced from a thermoplastic molding composition as claimed in claim 1.

* * * * *